E. E. NEAL.
ROLLER BEARING.
APPLICATION FILED SEPT. 15, 1917.

1,258,635. Patented Mar. 5, 1918.

WITNESS:
Pht. R. Litchel.

INVENTOR
Elmer E. Neal
BY
Augustus B. Stoughton,
ATTORNEY.

UNITED STATES PATENT OFFICE.

ELMER E. NEAL, OF PHILADELPHIA, PENNSYLVANIA, ASSIGNOR TO MARLIN ROCKWELL CORPORATION, OF PHILADELPHIA, PENNSYLVANIA, A CORPORATION OF NEW YORK.

ROLLER-BEARING.

1,258,635.      Specification of Letters Patent.      Patented Mar. 5, 1918.

Application filed September 15, 1917. Serial No. 191,509.

*To all whom it may concern:*

Be it known that I, ELMER E. NEAL, a citizen of the United States, and a resident of Philadelphia, in the county of Philadelphia and State of Pennsylvania, have invented certain new and useful Improvements in Roller-Bearings, of which the following is a specification.

The principal object of the present invention is to provide a comparatively inexpensive and improved substitute for taper roller bearings, or in other words, to provide a roller bearing which will do the work of a taper roller better than a taper roller bearing and which is much cheaper and more simple to make.

Figure 1:
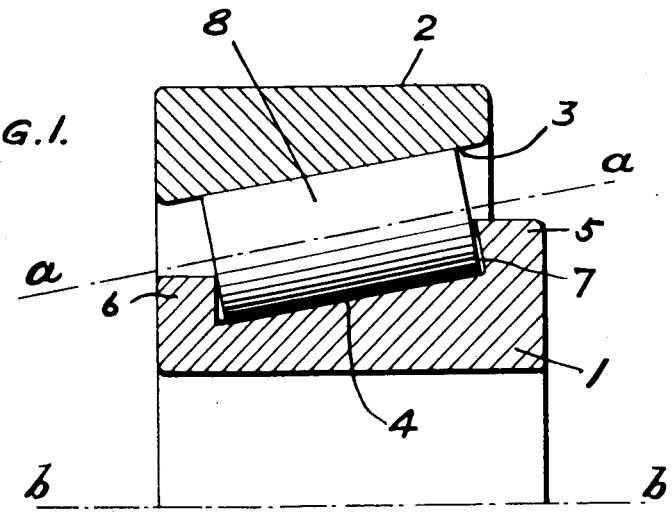

The invention will be claimed at the end hereof, but will be first described in connection with the embodiment of it chosen from other embodiments for the sake of illustration in the accompanying drawings, in which Figure 1, is a view, principally in section, of one-half of a roller bearing embodying features of the invention.

Figure 2:
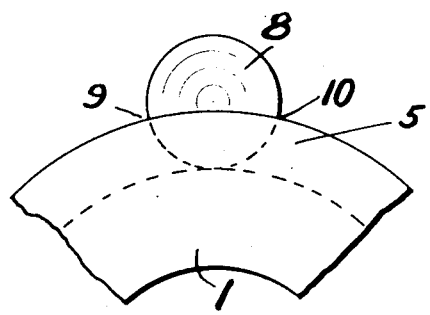
Figure 3:
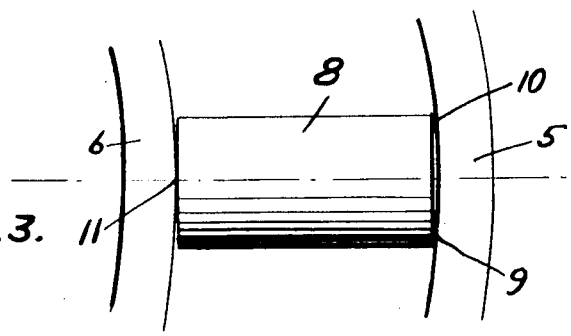

Fig. 2, is an end view, looking toward the left in Fig. 1, of parts of the bearing therein illustrated, and Fig. 3, is a diagrammatic view of parts of the bearing looking at right angles to the axis *a—a* of the roller shown in Fig. 1.

In the drawings 1 and 2 are inner and outer rings arranged one within the other and they are concentric in respect to the common axis *b—b*. These rings have on the inner surface of one, 2, and the outer surface of the other, 1, opposed roller races 3 and 4, inclined at the same angle in respect to the common axis *b—b* of the rings. One of the rings, in the present instance the inner ring 1, is provided with a pair of spaced shoulders 5 and 6, of which one, 5, is undercut as at 7. The other shoulder 6 is shown as perpendicular to the axis *b—b*. 8 is one of a ring of cylindrical rollers and its ends or bases are flat and are perpendicular to its axis *a—a*. The cylindrical form of the rollers simplifies and cheapens their manufacture contrasted to the cost of taper rollers and the fact that the inclined races are parallel and are disposed at the same inclination with respect to the axis *b—b*, facilitates and cheapens the manufacture of the rings in comparison with rings having conical races, whose solid angles are of different magnitudes.

Experience demonstrates that a bearing constructed in the manner described is not only comparatively inexpensive to make but is efficient in practice notwithstanding the fact that the cylindrical form of the rollers and the parallel disposition of the races may and probably does involve some relative slip of these parts, but the effect of such slip, if any, is negligible. The undercut shoulder 7 insures contact at two points, indicated at 9 and 10 in Fig. 2, between the end or base of the roller 8 and the shoulder, and this tends to keep the rollers parallel with each other. At the shoulder 6 there may be but one point of contact, as indicated at 11 in Fig. 3.

What I claim as new and desire to secure by Letters Patent is:

A roller bearing comprising the combination of inner and outer rings having parallel opposed roller races inclined at the same angle in respect to the common axis of the rings and whereof one is provided with a pair of spaced shoulders of which one is undercut, and a circle of cylindrical rollers arranged between said races and between said shoulders and having two point contact with the undercut shoulder, substantially as described.

ELMER E. NEAL.